United States Patent Office 3,337,529
Patented Aug. 22, 1967

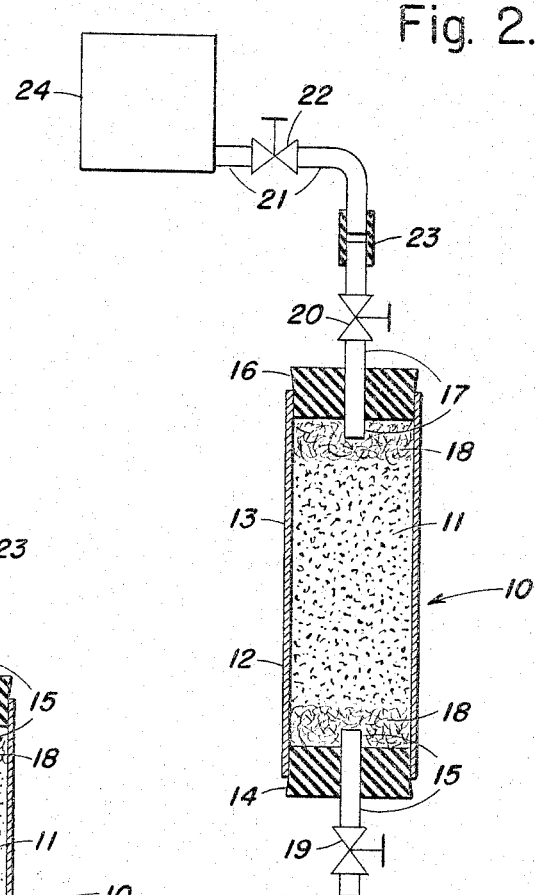
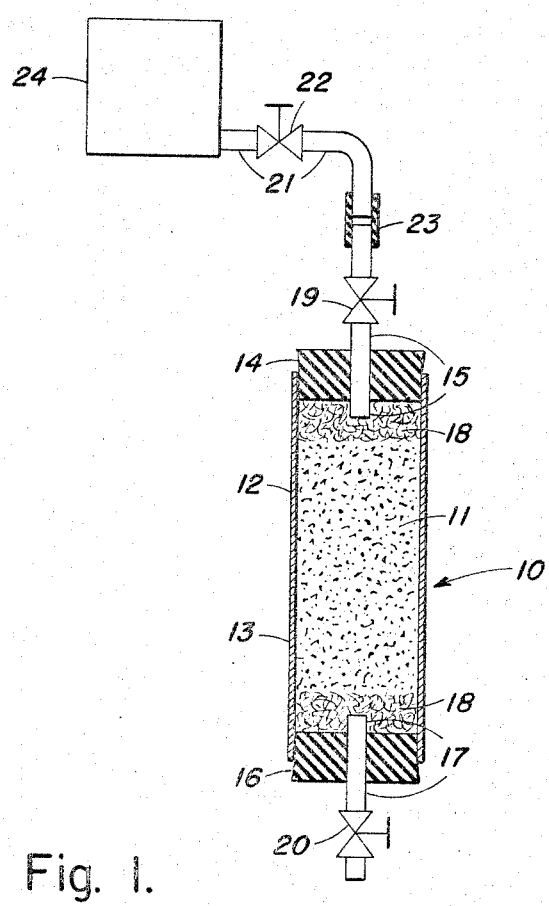
Fig. 2.
Fig. 1.
INVENTOR
Louis Laufer
BY Flynn, Marn
& Jangarathis
ATTORNEYS

3,337,529
METHOD FOR CHROMATOGRAPHICALLY SEPARATING NUCLEOTIDES AND OTHER ORGANIC MATERIALS FROM A MIXTURE CONTAINING SAME
Louis Laufer, Bronx, N.Y., assignor to Schwarz Bioresearch, Inc., Orangeburg, N.Y.
Filed May 18, 1965, Ser. No. 456,778
15 Claims. (Cl. 260—211.5)

This invention relates to the separation of chemicals from mixtures containing the same. More specifically, the invention relates to the purification, separation and concentration of chemicals from mixtures containing the same and other chemicals which have hitherto been separated only by complicated and/or expensive techniques.

Chromatographic adsorption has become of increasing value in recent years as a technique for resolving mixtures of compounds which are difficult or, in some instances, impossible to resolve with other separation procedures. Yet, there are shortcomings of current chromatographic techniques in commercial production of chemicals and as an analytical tool in chemical operations.

Columns which contain adsorbents such as alumina magnesia, talc, hydroxylapatite, ion exchange polymers etc., are employed to separate and purify similarly structured substances from impurities and, if possible, from each other in crude solutions, extracts, etc. Usually after passage of a solution, which may be aqueous or non-aqueous, onto an adsorbing column some stratification of chromatographic bands of the various chemicals in the solution occurs on the column. Such stratification may improve as different eluting agents are passed through the column for separating different compounds and eluting each in turn where possible. As elution progresses, the banded layers of chemicals move down the column. Often compounds of similar structure such as nucleoside triphosphates separate only slightly, if at all, as they move down the column, and their separation into pure substances entails rechromatography on another column and elution with other eluting agents. Such manipulations can result in handling and concentration losses. With expensive substances such as radioactively labeled compounds, losses of this kind may make the cost of preparation prohibitive.

Furthermore, separation on columns of compounds, having very similar affinities for the adsorbent or exchanging substance comprising the columns, generally requires extremely long columns—a large ratio of column height to diameter—in order to maximize the column "theoretical plates" available for separation. Extremely long columns present high resistance to flow, permit only slow through-put rates and present large hold-up volumes; therefore, column operation is difficult or impractical. The alternative of restoring to successive shorter columns or a battery of shorter columns, generally involves losses of compounds being separated and greater operating expense.

It is an object of the present invention, therefore, to provide a new method for purifying, concentrating and separating chemicals by chromatography. Another object is to provide a simplified chromatographic method whereby effective length of a given chromatographic column is extended, while retaining advantages of a relatively short column such as advantages of rapid through-put and low hold-up of chemicals. Still another object is to provide a method for separating chemicals which are difficult to separate from each other. Other objects of the invention will be apparent from the following description.

In accordance with the invention, a compound is separated substantially free from a mixture containing the same, by:

(a) subjecting said mixture to chromatography on a vertical column of a chromatographically active adsorbent to form a chromatographic band of said compound on said adsorbent;
(b) eluting the column in (a) with a solvent to cause said band to move from an upper portion of the column to a lower portion thereof;
(c) inverting said column;
(d) eluting the inverted column with a solvent; and
(e) recovering an eluate containing said compound substantially free of a contaminant of said mixture.

The invention also makes possible the separation of compounds which are difficult to separate from each other from a mixture containing such compounds to provide two fractions wherein one fraction is richer in the first compound and the other fraction is richer in the second compound. Such separation comprises:

(a) subjecting said mixture to chromatography on a verical column of a chromatographically active adsorbent to form at least two chromatographic bands on said adsorbent;
(b) eluting the column in (a) with a solvent to cause said bands to move from upper portions of the column to lower portions thereof;
(c) inverting said column;
(d) eluting the column of (c) with a solvent; and
(e) recovering an eluate richer in one of the compounds of said mixture.

The method of this invention permits separation of small amount of expensive substances with substantially no handling losses or use of a second column. When two like compounds in an extract have moved down a column after eluting most of the impurities off the column, then these substances which now are layered (with little or no separation) near the bottom of the column can be readily separated by inverting the column (turning 180°) and resuming elution with another eluting agent from the top of the inverted column. Under these conditions, the layered compounds are no longer at the bottom but are now at the top of the column, so that the whole length of the column becomes available for a differential separation or elution and recovery of the desired substances. This technique permits separation of very similar compounds on columns without elution from one column and rechromatography on another column. Using such a procedure, advantage is taken of slight differences in the chemical properties of the similar substances for separation on the same column, such as differential affinity for the column adsorbent, differences in pK values of the substances, differences in polarity, differences in ionic charge, differences in chelating properties, differences in solubility in various solvents, etc. For instance, if solubility in one eluting agent which moves two compounds to the bottom of a column is the same, then, on inverting the column, the use of another solvent in which a marked difference in solubility is known to exist will permit the separation of the compounds on elution. The same advantage can be taken by differencies in pK values of different moieties of similar compounds.

As is readily apparent to anyone skilled in the art the principles involved in the method of this invention can be extended to the separation of two or more compounds or ions, and the column can be inverted one or more times using a different eluting agent or combinations of one or more eluting agents, each time to affect or extend the desired separations without removing the compounds or ions from the column until the desired separation is effected.

A fuller understanding of the invention may be had by referring to the following description taken in conjunction with the accompanying drawing wherein like numerals designate like parts, in which:

FIGURE 1 schematically illustrates a chromatographic column, and

FIGURE 2 schematically illustrates the chromatographic column of FIGURE 1 in an inverted position.

Referring to FIGURE 1, there is illustrated a chromatographic column 10 fabricated out of glass, plastic, steel or any other suitable material. Within the column 10 there is provided a bed 11 formed of adsorbent particles. For the purpose of facilitating the description of the invention the column 10 is divided into two zones, one zone generally designated as 12 and the other zone generally designated as 13. A stopper 14 including line 15 is inserted into the top of the column 10, while a stopper 16 including a line 17 is inserted into the bottom of the column 10. There is provided between the bed 11 and lines 15 and 17, a suitable inert material, such as glass wool, such material being generally indicated as 18.

In lines 15 and 17, there is provided valves 19 and 20, respectively. As illustrated in FIGURE 1, line 15 is connected by a removable connection 23, such as rubber tubing or the like, to a line 21 including a valve 22. The line 21 is connected to a vessel 24 from which charge material is passed through lines 21 and 15 under the control of valves 22 and 19, respectively. Material is withdrawn from the column 10 through line 17 under the control of valve 20.

In FIGURE 2, the column 10 is illustrated in an inverted position when compared with FIGURE 1. Column 10 can readily be inverted by closing valves 19 and 20, disconnecting removable connection 23 and turning the column 10 through an angle of 180°. It will be apparent that the column 10 can be supported by suitable supporting means (not shown), and that a turning mechanism (not shown) can be associated with the supporting means and the column.

Chromatographic adsorbents and solvents for eluting the same are well known in the art. Reference is made to the texts Chromatography of E. and M. Lederer, 1953, Elsevier Publishing Company, New York, and Ion Exchangers in Organic and Biochemistry of C. Salmon and T. R. E. Kressmann, 1957, Interscience Publishers, Inc., New York, for details relative to such adsorbents, solvents and conditions for employing the same in concentrating, purifying and separating a variety of chemical compounds. Broadly, the adsorbents can be described as "chromatographically active."

By way of illustration, ion exchange polymers such as strongly basic polymers of aromatic amines are useful in effecting the separation of nucleoside phosphates in the present invention. Particularly suitable is Dowex 1, in chloride form, which is a strongly basic anion exchange resin, containing quaternary ammonium groups as its functional groups; the groups are attached to a styrene-divinylbenzene copolymer.

Solvents used for elution of an adsorbent are selected in relation to the compound or compounds forming chromatographic bands with the adsorbent. The same or different solvent can be used throughout a separation sequence, (a) through (e) above, or two or more different solvents can be employed. It is a feature of the invention to employ different solvents in steps (b) and (d). Thus, should solubility in one eluting solvent be substantially the same for two compounds, as the solvent moves the two compounds from an upper to a lower portion of a column, a second solvent can be used after inverting the column. The second solvent is one for which the two compounds have different solubilities. As this second or different solvent is used on the inverted column, separation of the two compounds is realized.

The invention is further illustrated by the following specific examples, which are, as indicated, to serve as illustrative of the invention and in no sense as limiting the invention.

*Example 1*

A glass tube 10 equipped as shown by FIGURES 1 and 2 was used. The tube had the following dimensions: 74 centimeters (cms.) in length and 1 cm. inside diameter. The length of the resin column in tube 10 was 54 cms. The resin used was Dowex 1, chloride form, 50–100 mesh.

A radioactive preparation of uridine-2-$C^{14}$-5′-monophosphate (UMP) was phosphorylated enzymatically with yeast to a desired product, uridine-2-$C^{14}$-5′-triphosphate (UTP). The phosphorylated mixture, however, contains a large number of anions, including: hexose phosphates; inorganic salts, adenosine monophosphate (AMP); adenosine diphosphate (ADP); adenosine triphosphate (ATP); uridine-2-$C^{14}$-5′-monophosphate (UMP), and uridine-2-$C^{14}$-5′-diphosphate (UDP). Ordinarily, even with an ion exchange column, complete separation of adenosine triphosphate (ATP) and uridine triphosphate (UTP) is extremely difficult, if not impossible.

The phosphorylated mixture was charged at a pH 7.0 to vessel 24 and was passed through line 21, connection 23 and line 15 into column 10 containing the resin. After the resin column had been so charged, it was then washed with water which had been added to vessel 24 and similarly routed to the column 10. After washing the column 10 with water, aqueous hydrogen chloride, 0.01 normal, was added to vessel 24 and was also routed to column 10 to serve as an eluant. Monophosphates including hexose monophosphates and inorganic phosphates, are eluted with the acid solution. Adenosine monophosphate (AMP) was removed first, followed by uridine monophosphate (UMP). Next, in sequence, an eluting agent comprising 0.02 molar sodium chloride in 0.01 normal hydrogen chloride, was similarly introduced into the resin column. This provided an eluate containing adenosine diphosphate (ADP). Next, the eluant was 0.05 molar sodium chloride in 0.01 normal hydrogen chloride, to provide an eluate containing uridine diphosphate (UDP). The subsequent eluating agent was 0.08 molar sodium chloride in 0.01 normal hydrogen chloride and served to remove adenosine triphosphate (ATP). The column was then washed with water until water taken from the column through line 17 was free of chloride.

The column was then inverted. Introduced from vessel 24 to column 10 through line 21, connection 23 and line 17 was a 0.07 molar solution of sodium carbonate which converted the resin chloride column to the corresponding carbonate form. The resin column was then washed with water. An eluting agent comprising 1 molar aqueous ammonium bicarbonate solution was passed downwardly through the column 10 from vessel 24, until complete removal of uridine-2-$C^{14}$-5′-triphosphate (UTP) was indicated by ultraviolet measurements on the eluate. Radioautographic analysis of the radioactive UTP showed that it has a purity of greater than 99.5 percent by weight. Separation of UTP from its eluate is accomplished by repeated vacuum concentration at room temperature (20–25° C.) to dryness. The excess ammonium bicarbonate sublimes off leaving a pure ammonium salt of UTP.

*Example 2*

The procedure described in Example 1 was followed, except that adenosine triphosphate (ATP) was not removed with the eluting agent of 0.08 molar sodium chloride in 0.01 normal hydrogen chloride. Rather, the chloride column containing the adenosine triphosphate (ATP) and uridine-2-$C^{14}$-5′-triphosphate (UTP), was converted to a carbonate resin column with sodium carbonate, as in Example 1, after the column had been inverted. The carbonate resin column was then contacted with the 1 molar aqueous ammonium bicarbonate solution. In this instance, the uridine-2-$C^{14}$-5′-triphosphate (UTP) was removed in the eluate before the adenosine triphosphate (ATP). Again, the purity of UTP so recovered was greater than 99.5 percent, as determined by radioautographic analysis. The ATP was recovered from the column by continuing the use of 1 molar ammonium bicarbonate as the eluting agent.

Thus, it will be apparent that the order of recovery of ATP and UTP can be selected to meet requirements. If the resin column is maintained in the chloride form until ATP is removed therefrom, ATP is recovered before UTP. In contrast, if the resin column is converted to the carbonate form, before recovery of ATP therefrom, UTP is recovered before ATP.

*Example 3*

A mixture containing hexose-phosphates, thymidine monophosphate, thymidine diphosphate, thymidine triphosphate, adenosine diphosphate, adenosine triphosphate, and some inorganic salts was passed onto a Dowex-1 chloride column at pH 7.0. After washing the column with water, the column was eluted with 0.01 N HCl and 0.04 M NaCl to remove mono- and diphosphates. The column was then washed with water and treated with a 1 molar solution of $Na_2CO_3$ until the eluate was chloride free. Again the column was washed with water and then inverted and eluted with a gradient solution of 0.8 molar $NH_4HCO_3$ passing into water. Under these conditions, thymidine triphosphate (TTP) was eluted first in pure form, followed by adenosine triphosphate (ATP), also without contamination from other ultra violet absorbable material. Ordinary elution with acid or with bicarbonate without inversion of the column did not give a clean separation of TTP from ATP.

In addition to the nucleoside phosphates shown in the illustrative examples, the invention can be employed advantageously for recovery of a number of classes of compounds or individual compounds. Typical are:

Purine bases—adenine, guanine, hypoxanthine, caffeine, theobromine, paraxanthine, theophylline, 2 - aminouric acid, 2,6-diaminopurine, etc.;

Pyrimidine bases—uracil, thymine, cytosine, divicine, 5-methyl cytosine, 2-amino-4-methyl pyrimidine, orotic acid, 6-methyluracil, 6-aminouracil, 4,6-dihydroxypyrimidine, 5-aminouracil, etc.;

Nucleosides—uridine, thymidine, adenosine, xanthosine, inosine, guanosine, cytidine, orotidine, 5-methyl cytidine, etc.;

Amino acids—glycine, alanine, valine, leucine, phenyl alanine, tyrosine, tryptophane, lysine, arginine, methylionine, histidine, glutamic acid, aspartic acid, etc.;

Hydrocarbons—xylene isomers, octane isomers, methyl naphthalenes, etc.;

Sterols—progesterone, corticosteroids, etc.;

Xantholphylls—zeaxanthin; cryptoxanthin, etc.; and

Carotenes—lycopene, B-carotene, etc.

It is contemplated herein that inversion of a column, such as 10 above, can be regulated by suitable automatic controls. So also, charging of a mixture to be treated and subsequent charging of various eluants can be controlled automatically.

Eluants from a column can be followed by: electrical conductivity, pH and titration determinations. Particularly advantageous for separations of the compounds illustrated above in Examples 1-3 are: spectrophotometric measuring or monitoring in the visible or ultra violet region; measuring of radioactivity; and monitoring by infrared measurement.

Operating conditions including temperature, pressure and flow rates can be varied considerably dependent upon the mixtures to be treated and the concentration of compounds therein to be removed or concentrated. With concentrations of compounds in charge mixtures of Examples 1-3, above, of the order of 1 to 10 milligrams, and with small columns containing 10-20 milliliters of ion exchange resin, flow rates are generally between 1-5 milliliters per minute, and temperatures and pressures are ambient—near room temperature (20.25° C.) and ordinary pressure (about atmosphere).

The invention has been illustrated above by the descriptive material and examples. It is to be understood that the invention is susceptible of other embodiments and that such embodiments are contemplated herein.

I claim:
1. A method for separating a compound substantially free of a contaminant from a mixture containing the same, which comprises:
   (a) subjecting said mixture to chromatography on a column of a chromatographically active adsorbent to form a chromatographic band of said compound on said adsorbent;
   (b) eluting the column in (a) with a solvent to cause said band to move from an upper zone of the column to a lower zone thereof;
   (c) inverting said column;
   (d) eluting the inverted column with a solvent; and
   (e) recovering an eluate containing said compound substantially free of a contaminant of said mixture.

2. A method as defined by claim 1 wherein said mixture flows downwardly in contact with said column in step (a).

3. A method as defined by claim 1 wherein the solvent of step (b) differs from the solvent of step (d).

4. A method for separating at least two compounds which are difficult to separate from each other from a mixture containing such compounds, which comprises:
   (a) subjecting said mixture to chromatography on a column of a chromatographically active adsorbent to form at least two chromatographic bands on said adsorbent;
   (b) eluting the column in (a) with a solvent to cause said bands to move from upper portions of the column to lower portions thereof;
   (c) inverting said column;
   (d) eluting the inverted column with a solvent; and
   (e) recovering an eluate richer in one of said compounds.

5. A method as defined by claim 4 wherein the mixture contains at least two organic compounds.

6. A method as defined by claim 4 wherein the mixture contains at least two inorganic compounds.

7. A method as defined by claim 4 wherein the mixture comprises organic compounds and inorganic compounds.

8. A method as defined by claim 4 wherein the mixture comprises a biological material.

9. A method as defined by claim 4 wherein the mixture contains thymidine triphosphate, and adenosine triphosphate.

10. A method as defined by claim 4 wherein the mixture contains uridine-2-$C^{14}$-5'-triphosphate, and adenosine triphosphate.

11. A method as defined by claim 4 wherein said mixture flows downwardly in contact with said column in (a).

12. A method as defined by claim 4 wherein the solvent of step (b) differs from the solvent of step (d).

13. A method as defined by claim 4 wherein a second eluate is recovered after step (e), said second eluate being richer in a second compound than said mixture.

14. A method for fractionating a mixture containing nucleoside phosphate esters comprising thymidine triphosphate, adenosine triphosphate, related mono- and di-phosphates and inorganic salts, which comprises:
   (a) subjecting said mixture to chromatography on a vertical column of a synthetic anion exchange resin in the chloride form to form at least two chromatographic bands on said resin;
   (b) eluting the column in (a) with weak acid to remove said mono- and di-phosphates;
   (c) washing said resin with water until an eluate withdrawn is chloride free;
   (d) inverting said column;
   (e) eluting the column of (d) with aqueous ammonium bicarbonate; and
   (f) recovering a first eluate containing thymidine triphosphate substantially free of other compounds of said mixture, and a second eluate containing adenosine triphosphate substantially free of other compounds of said mixture.

15. A method for recovering substantially pure uridine-2-$C^{14}$-5'-triphosphate from a mixture of nucleoside phosphates, comprising:
(a) subjecting said mixture to chromatography on a vertical column of a synthetic anion exchange resin in the chloride form to form at least two chromatographic bands on said resin;
(b) eluting the column in (a) with acid to remove mono- and di-phosphates of said mixture;
(c) washing said resin with water until the eluate therefrom is chloride free;
(d) inverting said column;
(e) eluting the column of (d) with aqueous alkali metal carbonate solution, whereby the resin is converted to the carbonate form;
(f) washing the resin formed in (e) with water;
(g) eluting said column containing the washed resin of (f), with aqueous ammonium bicarbonate; and
(h) recovering an eluate containing uridine-2-$C^{14}$-5'-triphosphate substantially free of said other phosphates.

References Cited
UNITED STATES PATENTS 3,148,139  9/1964  Heller _____ 210—31

LEWIS GOTTS, *Primary Examiner.*

J. R. BROWN, *Assistant Examiner.*